No. 606,959. Patented July 5, 1898.
P. E. DOOLITTLE.
WATER JACKET FOR VEHICLE BRAKES.
(Application filed July 8, 1897.)
(No Model.)
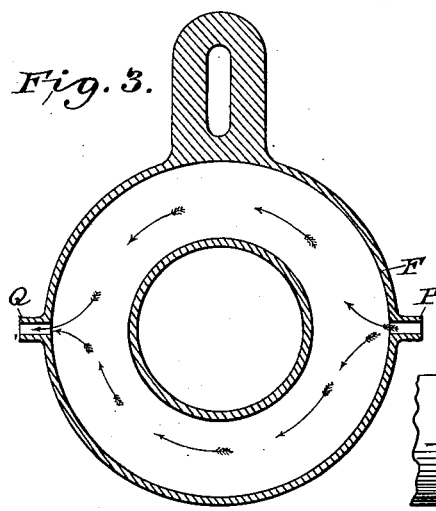
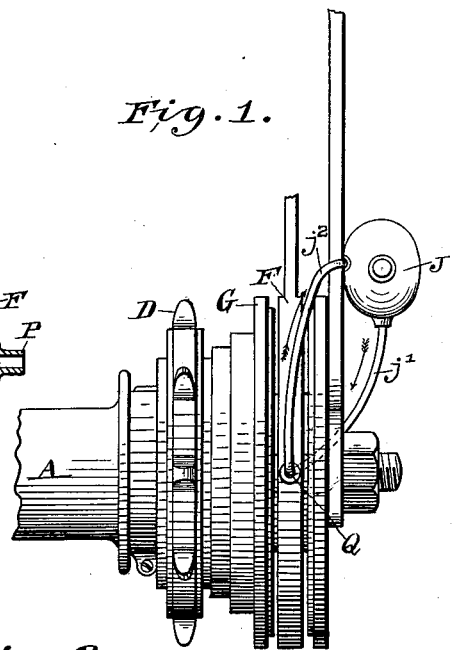
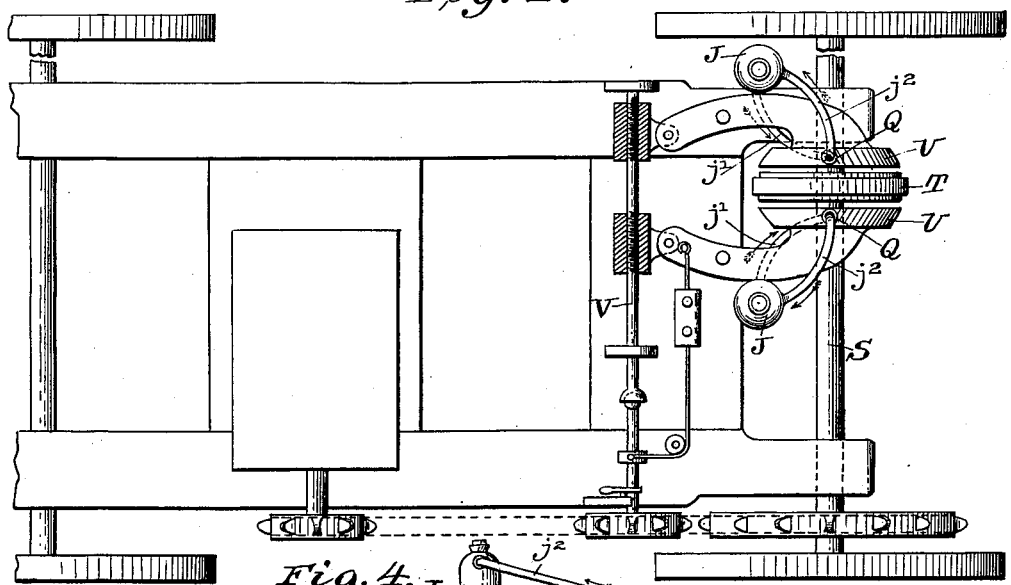
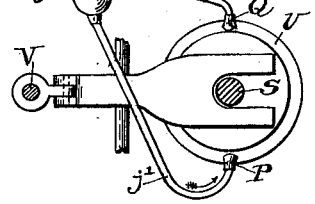
Witnesses
Jas. H. Blackwood
H. P. Doolittle
Inventor
Perry E. Doolittle
by J. H. Doolittle & Son
Attorneys

UNITED STATES PATENT OFFICE.

PERRY ERNEST DOOLITTLE, OF TORONTO, CANADA.

WATER-JACKET FOR VEHICLE-BRAKES.

SPECIFICATION forming part of Letters Patent No. 606,959, dated July 5, 1898.

Application filed July 8, 1897. Serial No. 643,896. (No model.)

*To all whom it may concern:*

Be it known that I, PERRY ERNEST DOOLITTLE, a citizen of Great Britain, residing at Toronto, in the county of York and Province of Ontario, Dominion of Canada, have invented certain new and useful Improvements in Water-Jackets for Vehicle-Brakes; and I do hereby declare the following to be a full, clear, and exact description of the invention, such as will enable others skilled in the art to which it appertains to make and use the same.

My invention relates to water-jackets for vehicle-brakes, and has for its object the prevention of the accumulation of heat at the point of application of the brake, thereby obviating the danger of overheating the parts and destroying the frictional material that may be employed.

To this end my invention consists of the means as hereinafter described and claimed.

In the accompanying drawings my invention is illustrated as applied, first, to an automatic friction-brake on a bicycle, and, second, to a friction-brake on the axle of a motor-vehicle, each having a special form of brake; but it is obvious that application of the invention may be made wherever it is possible to apply a water-jacket to a brake mechanism for the purpose of carrying away the heat generated by the brake by means of water circulation established by such heat.

In the drawings, Figure 1 is a plan view of hub of driving-wheel of bicycle, showing the brake mechanism thereon with my invention applied to the same. Fig. 2 is a plan view of motor-vehicle, showing brake and water-jacket. Fig. 3 is a detail of water-jacket disk and Fig. 4, a detail view, in side elevation, of one of the non-rotating disks and water reservoir and pipes.

Referring to the drawings, A is the hub of the rear driving-wheel of a bicycle, and D is the sprocket-wheel thereon. The sprocket-wheel is prevented from moving laterally, but has a limited rotary motion on the hub, such movement being controlled by the reversing pressure of the driving means produced by the automatic action of the rider in back-pedaling. Screw-threads are provided on the inner surface of a projecting part of the sprocket to engage corresponding threads on a non-rotatable laterally-moving sleeve, which on the backward movement of the sprocket is drawn inward on the hub. A disk G, having a frictional surface, is secured to the sprocket-wheel and a similar disk I to the outer end of the traveling sleeve. Between the two disks and loosely embracing the axle is a hollow contact-plate F, fixed to the frame of the vehicle, as shown. When the traveling sleeve is drawn inward, as above described, it carries with it the outer friction-disk, which bears against the contact-plate, and the latter is thus clamped between the two rotating friction-surfaces, whereby the desired braking action is produced. This brake mechanism is fully set forth and claimed in my pending application, Serial No. 633,715.

It will be seen that in a long descent down a steep grade with the continuous application of the brake the frictional contacting parts will become highly heated, and the frictional surfaces, composed of leather, rubber, and similar material, will be burned out unless the heat thus generated be in some manner carried away. My invention aims particularly to accomplish this result.

The contact-plate is hollow and is adapted to be filled with water. This water is supplied from a small reservoir or bag J, secured to the frame of the bicycle. In the lower part of the hollow plate is an inlet P, and to this inlet the water is led from the reservoir by means of a tube $j'$. At the upper part of the plate is an outlet Q, through which the heated water is led back to the reservoir by a tube $j^2$.

In operation when the brake has been applied and the friction-disk and contact-plate clamped together the friction generated by the contact of these parts will heat the plate F, which will, however, be kept cool up to a certain point by the water in said plate; but when the heat reaches a higher degree the water-supply in the plate will also become heated, and this heated water, being lighter than the colder water in the pipe and reservoir, will be forced up and out through the outlet, the colder water taking its place. A circulation is thus established, which will continue as long as the parts remain heated and will serve to keep the heat down to a degree that will not injuriously affect the contacting parts.

In Fig. 2 the principle of the water-jacket is shown applied to a brake, similar to the one above described, used on a motor-vehicle.

S is the axle of the vehicle, provided with a disk T, rotating therewith. U are disks adjacent to said first disk and adapted to contact with the same. The disks U loosely surround the axle and are fixed against rotation. In this construction the middle disk is provided with frictional surfaces instead of the end disk, as in the case of the bicycle; but my invention is not limited to either arrangement, as a series of alternate rotating and non-rotating disks adapted to be compressed together may be employed.

The means of operating the brake consist of a rotating shaft V, connected at one end to the clamping-disks and at the other end having means for connection with the driving means, of said driving means, and of a lever adapted to operate said shaft to throw it in and out of engagement with the driving means whereby the brake is operated. These matters of the construction of the special form of brake mechanism, as shown, are fully set forth and illustrated in my pending application, Serial No. 642,096.

Each of the non-rotating disks U is provided with the water jacket and reservoir attached thereto, with means for producing the circulation of the water through the plates.

J is the water-reservoir; P, the inlet to the plates; Q, the outlet, and $j'$ and $j^2$ the inlet and outlet pipes, respectively, connecting the reservoir and plate. On the operation of the brake the heat engendered by the contacting plates starts the flow of water through the hollow plate and maintains the circulation until the friction is released.

In case more than two of the non-rotating contact-disks are employed each is provided with a water jacket, reservoir, and pipes, or are connected to a general reservoir.

Having thus described my invention, what I claim is—

1. The combination in a vehicle, of frictional brake contact-surfaces, with a water-jacket adjacent to said surfaces, a water supply and jacket and supply communications, whereby the heat engendered by the operation of said surfaces produces a water circulation for cooling said surfaces, substantially as described.

2. In a vehicle provided with alternating rotatable and non-rotatable friction brake-plates, and the driven support on which said plates are carried, in combination with a water-jacket forming part of the non-rotatable plate, a water supply and circulation, and means for forcing said plates together, whereby the heat accumulated by the application of the brake mechanism is absorbed by the water circulation, substantially as described.

3. In combination with a brake mechanism comprising rotatable and non-rotatable frictional contacting plates, said non-rotatable plate or plates hollow and adapted to contain water, a water-supply, and inlet and outlet pipes between said plate or plates and supply, substantially as and for the purpose described.

In testimony whereof I affix my signature in presence of two witnesses.

PERRY ERNEST DOOLITTLE.

Witnesses:
  E. E. DOOLITTLE,
  J. EMIL TRAUB.